United States Patent [19]
Edwards et al.

[11] Patent Number: 5,222,446
[45] Date of Patent: Jun. 29, 1993

[54] NON-POLLUTING INCINERATOR

[76] Inventors: A. Glen Edwards; Jeffery T. Edwards, both of 29123 Mahon Rd., Hockley, Tex. 77447; Richard B. Dicks, 5467 Carew, Houston, Tex. 77096

[21] Appl. No.: 844,896

[22] Filed: Mar. 2, 1992

Related U.S. Application Data

[63] Continuation of Ser. No. 647,706, May 29, 1991, abandoned.

[51] Int. Cl.⁵ .............................................. B09B 3/00
[52] U.S. Cl. .................................. 110/235; 110/211; 110/212; 110/214; 110/346
[58] Field of Search ............................. 110/210-214, 110/225, 235, 346

[56] References Cited

U.S. PATENT DOCUMENTS

| | | | |
|---|---|---|---|
| 4,162,654 | 7/1979 | Spitz et al. | 110/212 |
| 4,245,571 | 1/1981 | Przewalski | 110/212 X |
| 4,481,890 | 11/1984 | Lewis | 110/225 |
| 4,716,842 | 1/1988 | Williams | 110/211 |
| 4,901,654 | 2/1990 | Albertson et al. | 110/212 X |

Primary Examiner—Edward G. Favors
Attorney, Agent, or Firm—Lieberman & Nowak

[57] ABSTRACT

An incinerator having a first combustion chamber capable of receiving material to be incinerated, a second combustion chamber capable of receiving the flue gas, and a particulate extraction and containment system connecting the two is provided. Also provided is a method for incineration which involves combusting a material using a substoichiometric amount of oxygen so as to produce a flue gas, collecting the flue gas, cooling the flue gas, and combusting the flue gas using at least a stoichiometric amount of oxygen. The incinerator and method allow for the removal of toxins and toxin precursors prior to exposure to stoichiometric or greater levels of oxygen and to temperatures greater than 1000° F. Moreover, the incinerator and method provide for the recycling of materials and a reduction of waste volume to a level below that which is currently obtainable.

32 Claims, 14 Drawing Sheets

NON-POLLUTING INCINERATOR

This application is a continuation of application Ser. No. 647,706, filed May 29, 1991, abandoned.

BACKGROUND OF THE INVENTION

Waste disposal is a worldwide problem. One need only open a newspaper or turn on a television to witness problems encountered in efficiently disposing of waste. Concerns of pollution to land, water and air have resulted in statutes regulating the waste disposal industry. To comply with these statutes, many communities began disposing of waste in "sanitary" landfills. Unfortunately, landfills create many problems including ground water pollution and toxic leaks. Moreover, the large volume of waste generated is straining the capacity of landfills and many landfills are now full.

Some communities have turned to recycling waste. Unfortunately, low compliance with recycling ordinances together with pervasive amounts of non-recyclable waste have resulted in less than adequate results. Accordingly, there is an long felt need for an apparatus that permits recycling while reducing the volume of non-recyclable waste ultimately produced. The subject invention provides a solution to this problem.

Alternate forms of waste disposal are needed. Although, some communities dispose of waste by incineration, most incinerators produce noxious and toxic air emissions and/or insufficiently reduce waste volume. Current incineration systems typically reduce the waste to 15 to 30% (by weight), if the recyclable materials are removed from the feedstock prior to combustion. The large amounts of residual waste produced are the result of incomplete burning at excessively high temperatures in an attempt to economically handle huge volumes of waste on a continuous basis.

A particular problem of two-chamber modular incinerators, which have the advantage of efficient burning of certain very specific feedstock streams, is that in other applications, waste burnout is incomplete which increases ash residue quantities and reduces the efficiency of energy recovery. The subject invention overcomes this major deficiency of the typical two-chamber modular burn incinerator.

Incinerators using a primary combustion chamber operating using a substoichiometric amount of oxygen (air) and a secondary combustion chamber using a stoichiometric excess of oxygen (air) to insure complete combustion are known in the art (See, for example, U.S. Pat. Nos. 4,870,910 and 4,913,069, the contents of which are hereby incorporated by reference). However, no prior art reference teaches the advantages produced by cooling the flue gases generated from the first combustion prior to the second combustion (afterburn). By cooling these flue gases, the subject invention allows toxins and/or precursors of toxins, including fluorine, chlorine, volatile metals, and molecules involved in the formation of the super toxic organics, the dioxins and furans, to be condensed onto or as particulates (bottom ash) and removed prior to the second combustion. By removing particulate matter (bottom ash and fly ash) at this juncture, catalytic reactions on such ash, which comprise a primary mechanism for formation of the super toxic organics, are significantly precluded. This ultimately results in a cleaner gas being released to the atmosphere.

The method and apparatus of the subject invention solves a long existing problem and fulfills the long felt need for a high efficiency waste disposal system by providing a means for batch burning large quantities of waste that can be sorted for recyclable materials after burning. Non-recyclable residuals (ash) make up less than 3% of the original batch weight, and in the case of municipal waste, the ash can be processed to make cement. Removal of the recyclable materials is much easier after incineration due to the significantly smaller volume of residue. Moreover, differences in weight between metals, glass and ash facilitate sorting of the recyclable material. Medical or infectious waste residuals can also be disposed of using the subject invention.

SUMMARY OF THE INVENTION

Figure 1:
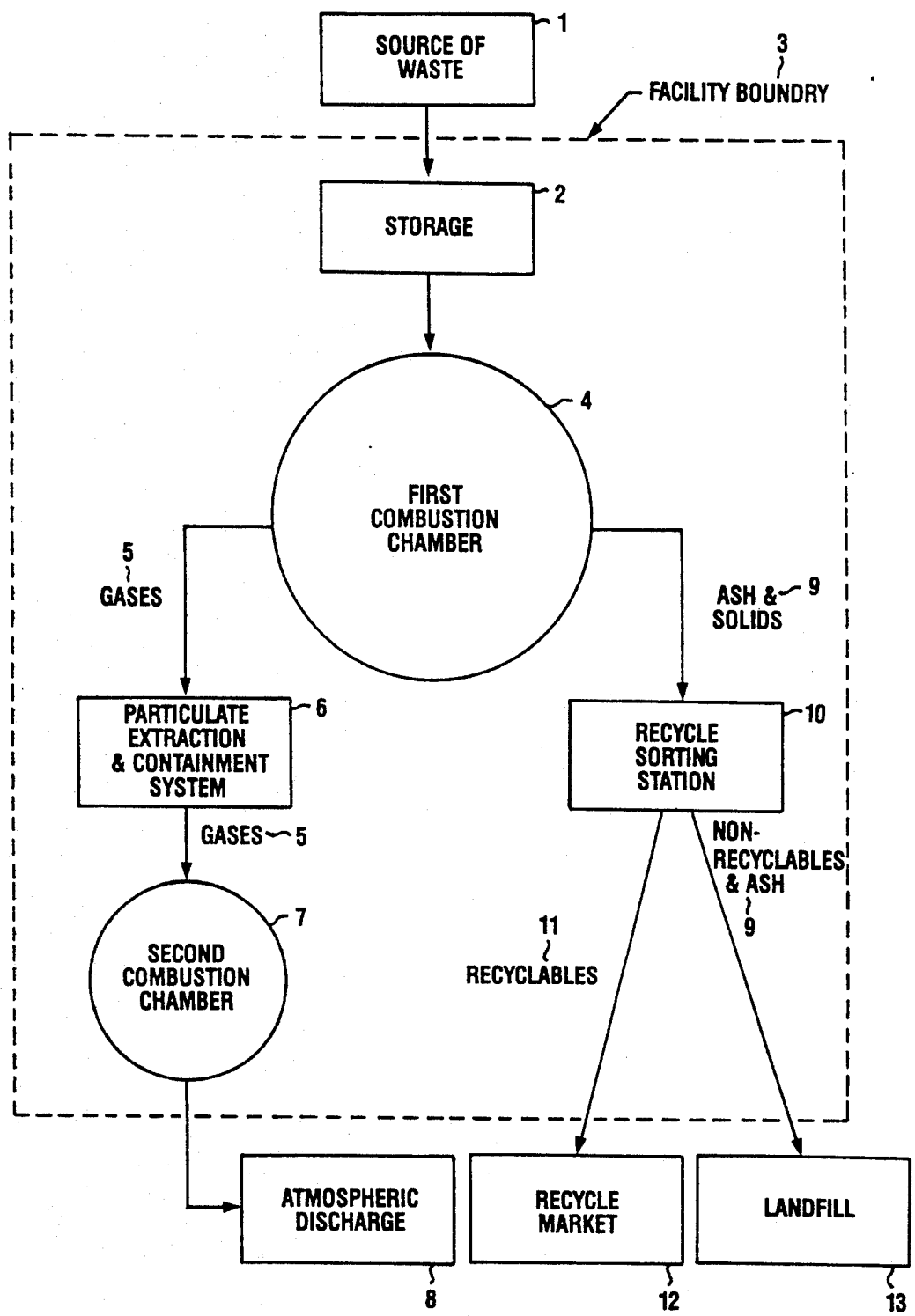
FIG. 1—Process Flow Diagram—Municipal Waste System

The subject invention provides an incinerator comprising a first combustion chamber (4) capable of receiving material to be incinerated, the first combustion chamber (4) being constructed in such a manner so as to allow combustion of the material and the production of a flue gas (5); a second combustion chamber (7) capable of receiving the flue gas (5) and being constructed to allow for combustion of the flue gas (5); and means for connecting the first combustion chamber (4) to the second combustion chamber (7), the means being capable of conducting the flue gas (5) from first combustion chamber (4) to the second combustion chamber (7) while reducing the temperature of and removing water vapor from the flue gas (5).

The subject invention also provides a method for incineration which comprises combusting a material using a substoichiometric amount of oxygen so as to produce a flue gas (5); collecting the flue gas (5); cooling the flue gas (5); and combusting the flue gas using at least a stoichiometric amount of oxygen.

DETAILED DESCRIPTION OF THE INVENTION

The subject invention provides an incinerator having a first combustion chamber (4), a second combustion chamber (7), and means for connecting the two. The first combustion chamber (4) is capable of receiving material to be incinerated and is constructed in such a manner so as to allow combustion of the material and the production of a flue gas. The second combustion chamber (7) is capable of receiving the flue gas (5), and is constructed to allow for combustion of the flue gas.

Means for connecting the first combustion chamber (4) to the second combustion chamber (7) are capable of conducting the flue gas (5) from first combustion chamber (4) to the second combustion chamber (7) while reducing the temperature of and removing particulates and water vapor from the flue gas. This reduction of temperature is critical because it allows water vapor and other volatile components, including such toxins as mercury, chlorine, fluorine and precursors to the super toxic organics, to be removed from the flue gas (5).

The first combustion chamber typically comprises a wall composed of a refractory material. The refractory material acts to retain the heat of combustion. An air inlet (located on the wall) provides a draft for sustaining the combustion. Air flow through the air inlet is best regulated by an air inlet damper valve (15). The air inlet damper valve (15) is positioned so that air enters the first combustion chamber (14) at an angle tangential to the wall. This provides a swirling motion to the gases.

To maintain the temperature of the first combustion chamber, gas (preferably natural or propane) enters the combustion chamber by a gas jet 17). Preferably, the gas jet (17) is positioned so a gas dispersed through the jet (17) enters the first combustion chamber (4) at an angle tangential to the wall. Means for igniting a gas dispersed through to the gas jet (17) are typically provided. Most preferably, these means comprise a continuous firing electrical spark.

In theory, any external heat supply may be employed. However, operation is typically done with propane or natural gas. A flue gas deflector (31) configured in such a manner so as to slow the velocity of flue gas exiting the first combustion chamber is normally provided. The flue gas deflector (31) slows the velocity of the flue gases and causes particulate matter to remain in the first combustion chamber (4). Removal of particulate matter in the reduced (substoichiometric) oxygen environment facilitates prevention of the formation of the super toxic organics (dioxins and furans) in the flue gas, through condensation of precursors and through removal of catalytic materials and co-reactants.

Material may be introduced to the first combustion chamber (4) in any manner. However, large scale operations usually employ a conveyor. The subject incinerator may also combust fluids which are typically introduced to the first combustion chamber (4) through a fluid nozzle.

The second combustion chamber (7) comprises a convolute section (44) and a swirl section (45), each having a wall made of a refractory material. As with the first combustion chamber (4), a gas jet (17) is typically positioned so that a gas dispersed through the jet (17) enters the convolute section at an angle tangential to the wall.

Means for igniting a gas dispersed through the gas jet (17) are provided, and it is preferred that the means are a continuous firing electrical spark.

The convolute section (44) of the second combustion chamber is configured in such a manner so that the flue gas (5) entering the convolute section (44) is directed in an upwardly spiraling direction. The flue gas continues to burn and spiral through the swirl section (45) and exits to the atmosphere (8) through a stack (46) connectively mounted on the swirl section (45).

Means for connecting the first combustion chamber (4) to the second combustion chamber (7) typically comprise a particulate extraction and containment system (6). The particulate extraction and containment system (6) preferably comprises a plurality of baffle plates (35 and 40), a filter (37), a fluid trap (38), and a fluid level controlling drain (39).

The subject invention also provides a method for incineration which comprises combusting a material using a substoichiometric amount of oxygen so as to produce a flue gas (5), collecting the flue gas (5), cooling the flue gas (5), and combusting the flue gas (5) using at least a stoichiometric amount of oxygen. Normally the oxygen is present as air which is in excess of that which is needed for complete combustion. The first (substoichiometric) combusting step is performed at a temperature of less than about 1000° F. and most preferably at a temperature of about 800° F.

In addition to cooling the flue gas (5), the subject method typically involves removing particulate matter and water from the flue gas (5).

The second combustion step (using at least a stoichiometric amount of oxygen) is performed at a temperature of greater than about 1000° F., and most preferably at about 2000° F.

FIG. 1 shows a general overview of the basic incinerator system. Waste moves from its source (1) to a storage area located at the facility (2). Waste then enters the first combustion chamber (4) where it is preferably burned at about 800° F. using a substoichiometric amount of oxygen. The flue gas (5) is then sent through a particulate extraction and containment system (6) where particulates are removed. The flue gas (5) is then cooled to further remove toxins and water vapor. The flue gas then enters the second combustion chamber (7) where it is combusted at a high temperature (preferably about 2000° F.) in the presence of at least a stoichiometric amount of oxygen. This gas is then discharged to the atmosphere (8).

The ash and solids (9) recovered from the first combustion chamber (4) are sent to a recycling and sorting station (10) where recyclables (11) are separated from non-recyclable and ash (9). Recyclables (11) are sent to the recycle market (12) and the non-recyclables are sent to a landfill (13) or are used in producing cement.

The following examples are set forth to better describe the subject invention. However, these examples are not intended to limit in any manner the scope of the invention set forth in the claims.

EXAMPLE 1

Figure 8:
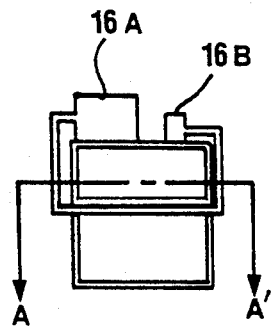
FIG. 8A—Diagram of first combustion chamber air inlet damper valve.
FIG. 8B—Diagram of first combustion chamber air inlet and a gas jet as viewed along line A—A of FIG. 8A FIG. 9—Diagram of cross-sectional view of first combustion chamber.
Figure 8:
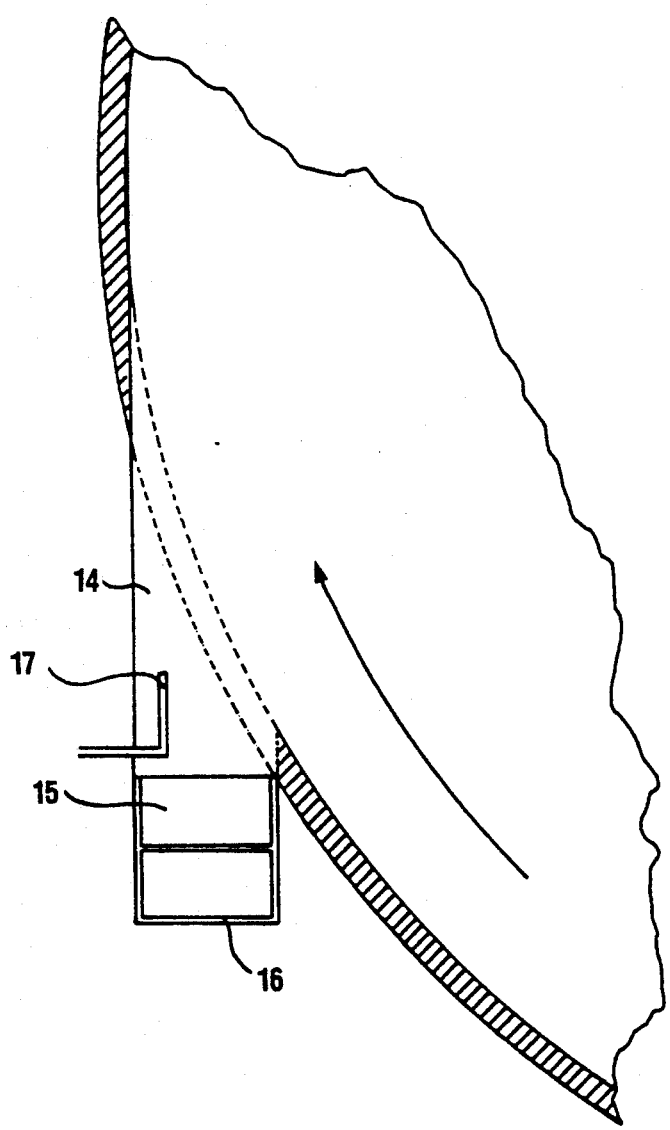

This example describes a typical municipal waste system (See FIG. 1). Municipalities produce a large volume of waste material which may represent the source of waste (1) for the subject invention. Conventional methods of waste collection may be used (e.g. garbage trucks, etc.) to bring the waste to a short term storage area (2). Large municipal incinerator systems may use a conveyor to move waste from a short term storage area (2) or delivery truck to the first combustion chamber (4). Small systems (two ton capacity or less) are typically hand loaded and do not require a conveyor loading system. After loading the first combustion chamber (4), the system is fired up. Temperatures in the first combustion chamber (4) are regulated so as to maintain a temperature of about 800° F. However, a temperature range of up to about 1000° F. maybe employed. Temperature regulation typically comprises computer controlled opening and closing of air inlet dampers (16) (See FIG. 8) so as to regulate the amount of air entering the first combustion chamber (4). The 800° F. operating temperature allows recyclable metals and glass to resist melting. Table 1 lists melting points of various recyclable materials commonly found in municipal waste.

TABLE 1

| Melting Points For Various Recyclable Materials | |
|---|---|
| Material | Melting Point (°F.) |
| Lead | 621 |
| Magnesium Alloys | 1100–1200 |
| Aluminum | 1220 |
| Nickel Alloys | 2030–2635 |
| Steel | 2370–2550 |
| Glass | 2600 |

Although the 800° F. is above the melting point of lead, this temperature was selected because restrictions on the use of lead have minimized the amount present in municipal waste. Air flow and auxiliary fuel flow into the first combustion chamber (4) is controlled to provide just enough air to slowly burn the waste (over a 4 to 8 hour period) at a temperature of about 800° F.

Table 2 lists selected data extracted rom calculations for a typical 25 ton municipal system.

TABLE 2

| Selected Data From System Calculation: | | | |
|---|---|---|---|
| % C Burned (As CO) | First Combustion Chamber Theo. Burn Temp | Fuel Cost/ Batch | % Theo. Air |
| 0 | 439.3842 | 1433.088 | 100.0000 |
| 10 | 483.3842 | 1284.443 | 95.14307 |
| 20 | 531.8402 | 1136.101 | 90.32464 |
| 30 | 584.1557 | 988.1807 | 85.50620 |
| 40 | 641.2748 | 840.7955 | 80.68777 |
| 50 | 703.8910 | 694.0627 | 75.86934 |
| 60 | 772.8378 | 548.0983 | 71.05091 |
| 70 | 849.1265 | 403.0185 | 66.23248 |
| 80 | 933.9458 | 256.9396 | 61.41404 |
| 90 | 1028.979 | 115.9777 | 56.59561 |
| 100 | 1136.000 | −25.7510 | 51.77718 |

Figure 2:
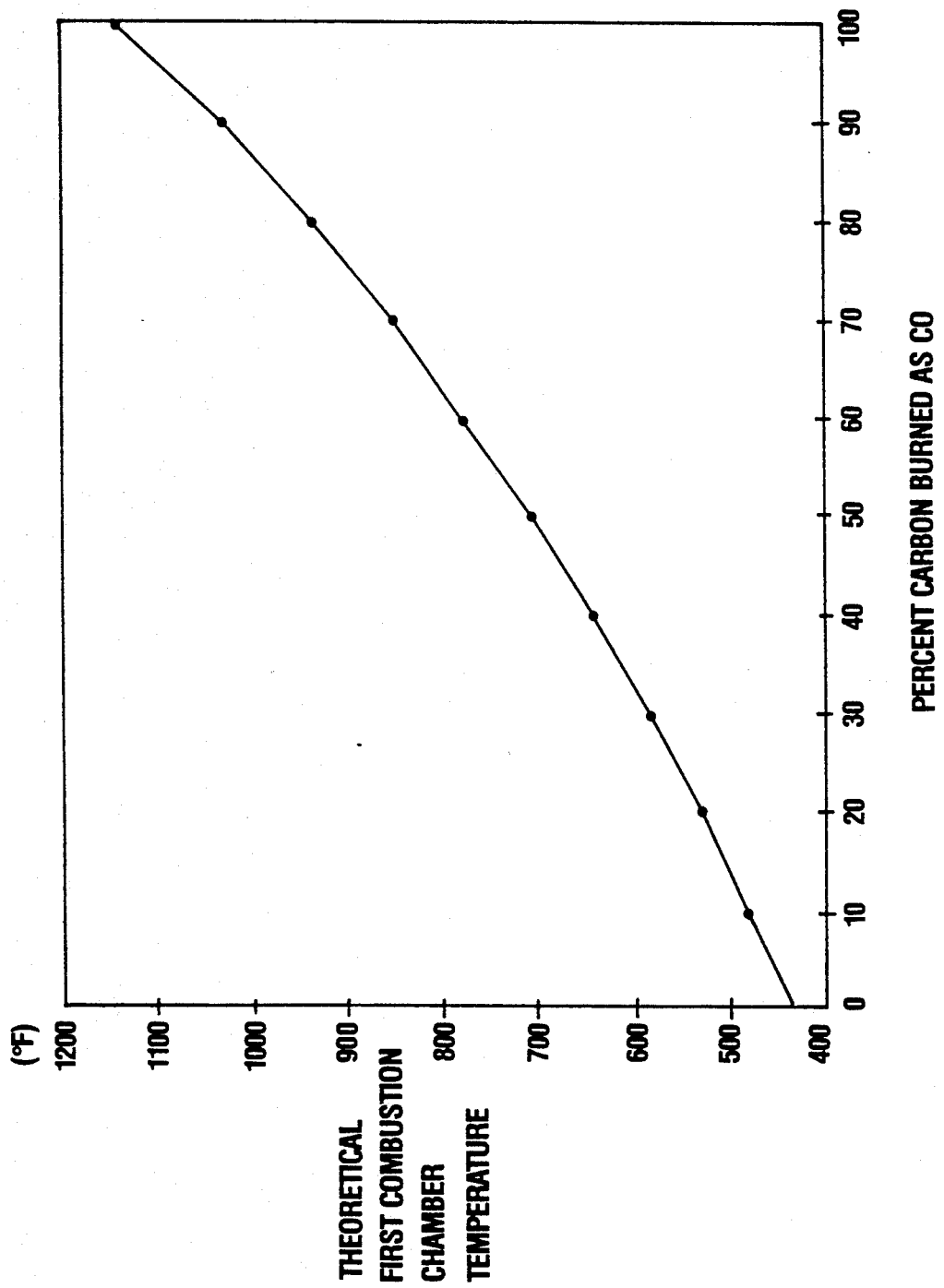
FIG. 2—Graph of percent carbon burned (present as CO) vs. first combustion chamber temperature.

Data for the first combustion chamber are compared graphically in FIGS. 2 to 7. FIG. 2 compares the percent of carbon burned as carbon monoxide (CO) against various theoretical burn temperatures in the first combustion chamber (4) (accounting for heat loss in the system). As the percent carbon burned to CO increases, the theoretical burn temperature also increases. Since burn temperature must be controlled to prevent the recyclable materials from melting, the percent carbon burned to CO must also be controlled. It is well known in the power generation industry that starving the air to a combustion process causes a portion of the carbon in the fuel (in this case waste) to burn to carbon monoxide rather than to carbon dioxide which is produced when carbon is burned in a complete combustion process. (See, *Heat Power Fundamentals*, by Carroll M. Leonard and Valadimir L. Maleev, Pitman Publishing Corporation, New York, N.Y., 1956, page 307.). Different size systems or the subject system burning a different type waste, will yield different values and a "triple point" must be selected from the several independent variables for those specific conditions.

Figure 3:
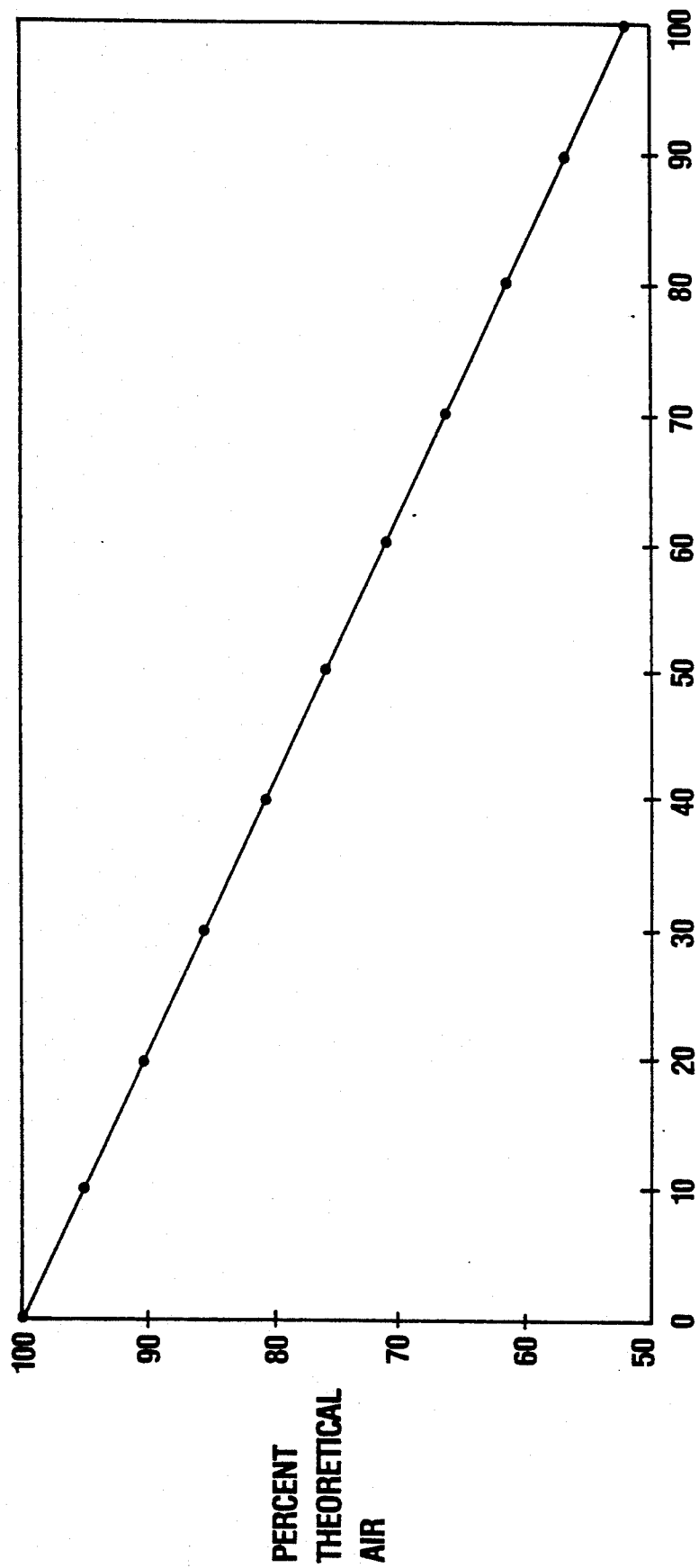
FIG. 3—Graph of percent carbon (present as CO) vs. percent theoretical air supplied.

FIG. 3 compares the percent of theoretical air actually supplied (100% theoretical air is required for complete combustion) to various percentages of carbon burned to CO, for a 25 ton municipal system. The lower the percent theoretical air supplied, the higher the percent carbon burned to CO.

Figure 4:
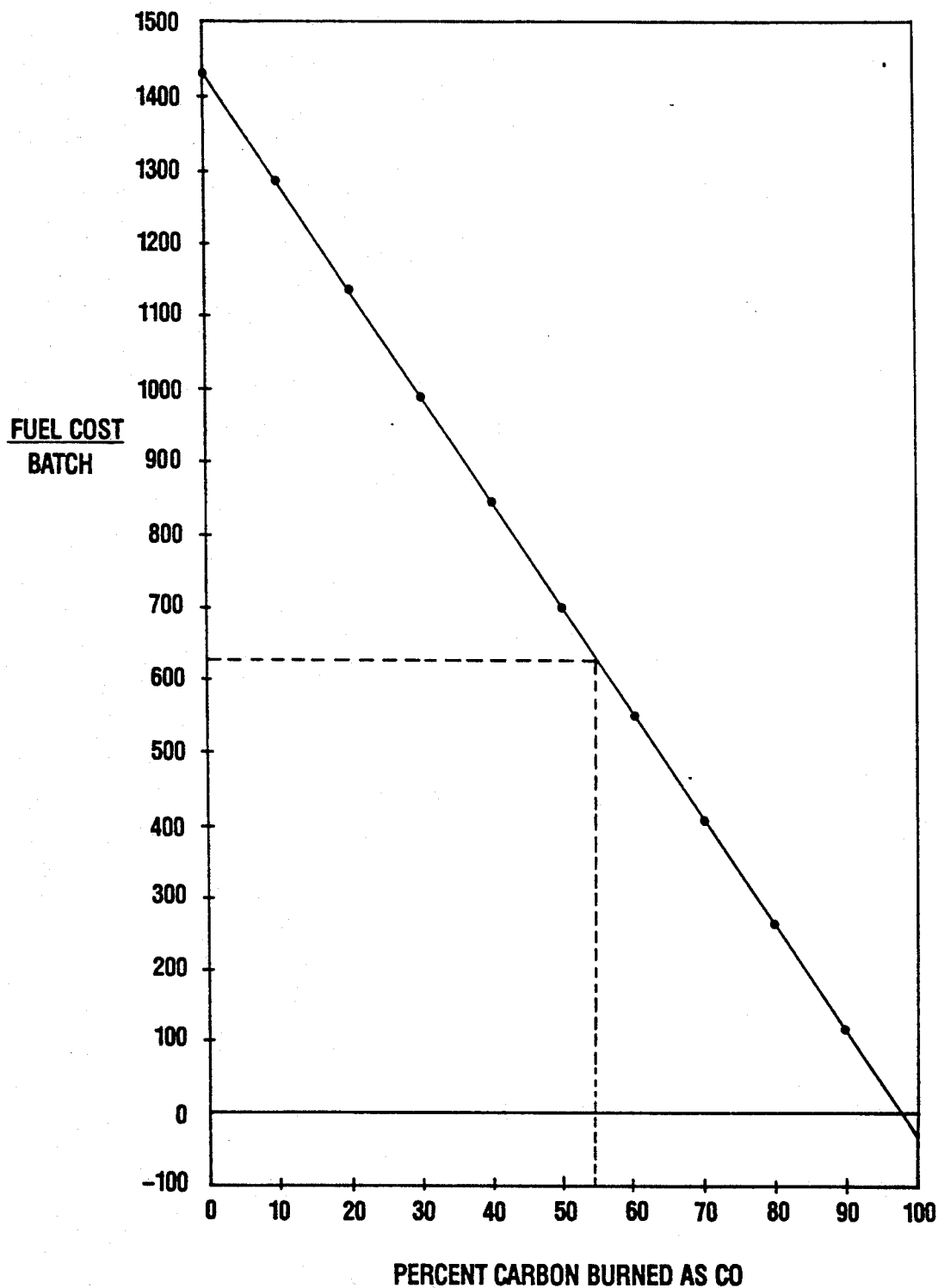
FIG. 4—Graph of percent carbon burned (present as CO) vs. system fuel costs.

FIG. 4 compares fuel cost for the entire system [first combustion chamber (4) supplemental fuel plus fuel to fire the second combustion chamber (7)] to the percent carbon burned to CO. Drastic reductions in the system fuel costs may be obtained by increasing the percent carbon burned to CO. For the incineration system illustrated in FIG. 4 burning waste having the properties listed in Table 3, the fuel cost per batch becomes negative beyond 98% carbon burned to CO.

TABLE 3

| Ultimate Analysis of Waste Material | | |
|---|---|---|
| Element | Chemical Formula | % By Weight |
| Carbon | C | 37.9 |
| Hydrogen | $H_2$ | 7.2 |
| Sulphur | S | 0 |
| Nitrogen | $N_2$ | 0.1 |
| Oxygen | $O_2$ | 53.8 |
| Water | $H_2O$ | 0 |
| Ash | — | 1.0 |
| Total | | 100.0 |

This indicates that, for this unit burning this particular waste, at values of 98% or more, the energy generated in the first combustion chamber (4) is greater than the total heat losses in the system [first combustion chamber (4), particulate extraction and containment system (6), second combustion chamber (7), plus the energy normally added to raise gases to the operating temperature of the second combustion chamber (7)]. Thus, 98% carbon burned to CO is the highest value obtainable.

Figure 5:
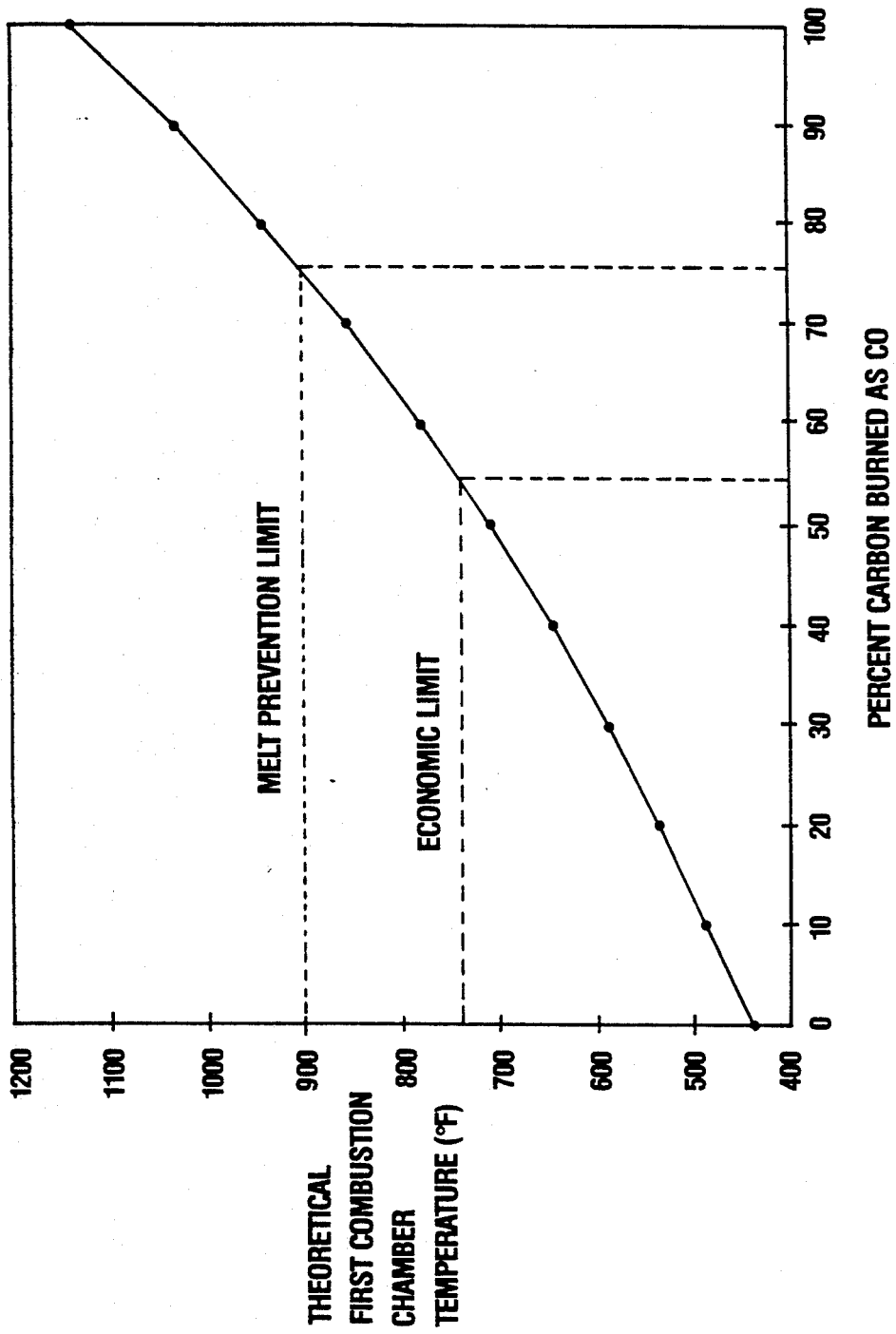
FIG. 5—Graph of percent carbon burned (present as CO) vs. first combustion chamber temperature.
Figure 6:
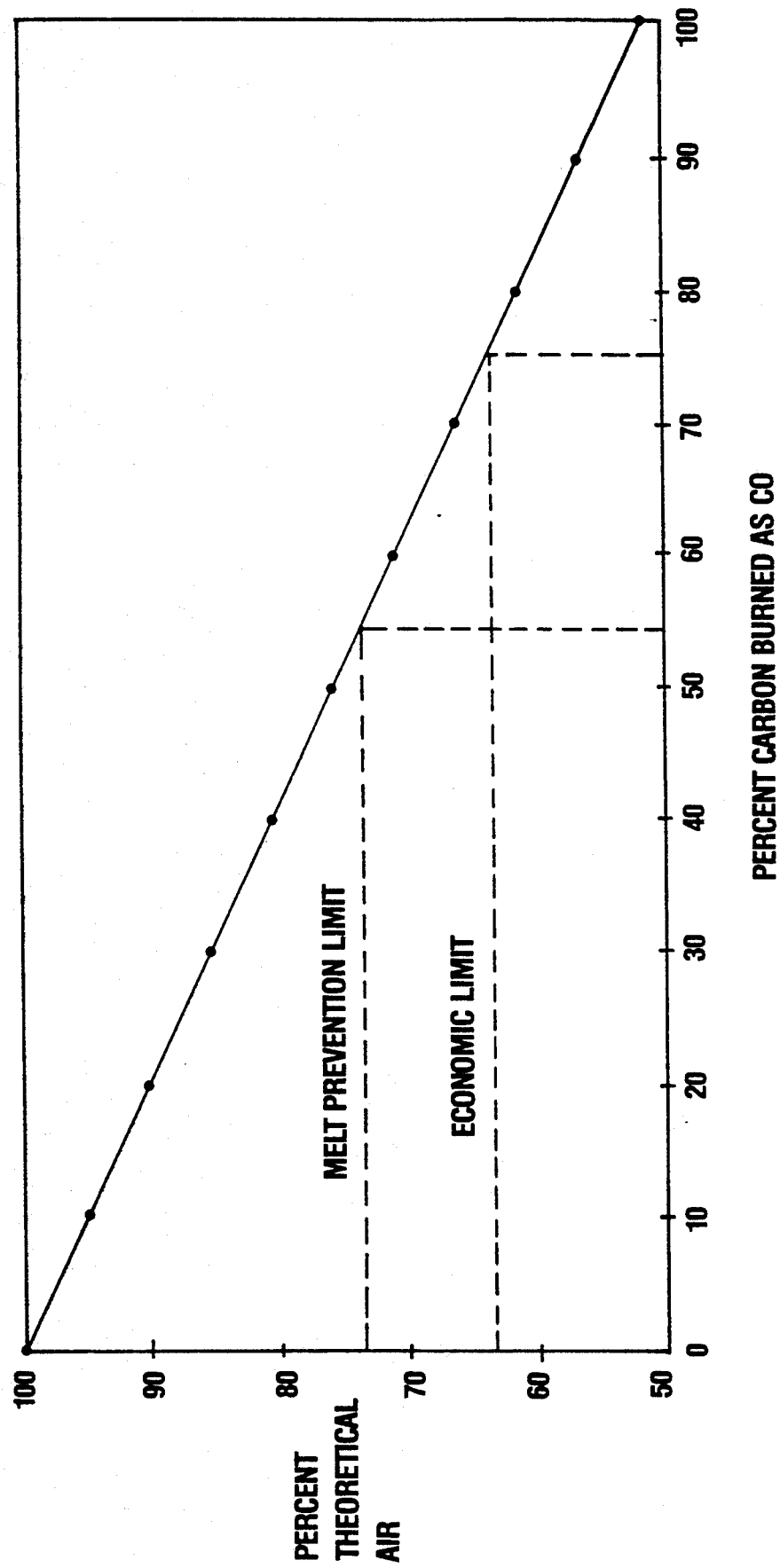
FIG. 6—Graph of percent carbon burned (present as CO) vs. theoretical air supplied.

To be competitive in today's market, the maximum allowable fuel cost is estimated to be about $25.00 per ton of waste or about $625.00 per batch in the 25 ton municipal system. The dashed line in FIG. 4 denotes this upper economic limit and thus sets forth the lower limit on the percent carbon burned to CO at 54.731%. Extrapolating the minimum allowable percent carbon burned to CO (set by the upper economical limit) and the theoretical first combustion chamber burn temperature vs. percent carbon burned to CO (see FIG. 2), it is found that 736.51° F. is the minimum economically feasible temperature for running the first combustion chamber (4). FIG. 5 graphically illustrates this analysis.

FIG. 5 shows that at a temperature of 900° F., 75.998% carbon burned to CO is the maximum amount allowable. Applying the maximum and minimum percent carbon burned to CO limits for the percent theoretical air actually supplied vs. percent carbon burned to CO graph (See, FIG. 6) it is necessary for a 25 ton municipal unit to operate between 63.535% and 73.590% of theoretical air to be economically practical.

The easiest factor to control in an incineration process is the amount of air supplied. The amount of air supplied is easily measured and may used to determine the upper and lower temperature. Air flow into the first combustion chamber (4) is automatically adjusted by the process control computer based on the actual temperature inside the first combustion chamber (4) as measured by thermocouples located at strategic points therein. Increasing air flow decreases the percent carbon burned as CO, and decreases the first combustion chamber burn temperature (See, FIG. 5 and 6). Conversely, decreasing air flow increases the burn temperature. When burning waste having a different chemical composition and/or a different heating value, the percent theoretical air required will vary but is easily accounted for by the process control computer.

Air flow into the first combustion chamber (4) is preferably by natural draft and is controlled by opening and closing an air inlet (14) using an air inlet damper valve (15). FIG. 8A illustrates a typical air inlet damper valve used in the first combustion chamber (4). Small systems typically have four air inlet damper valves (15) evenly spaced in a radial plane near the bottom of the straight wall section of the first combustion chamber (4). Larger size first combustion chamber may have six or eight air inlet damper valves (15) depending on size and air requirements for a particular application. As shown in FIG. 8B, all air inlet damper valves (15) are positioned so that air enters the first combustion chamber of an angle tangential to the internal surface of the refractory lining. This causes the air to swirl, generally in a clockwise direction, promoting good air circulation, good and uniform thermal transfer, and good mixing of the air with the particles. This helps strip away the burned surfaces from the waste so that burning can propagate from the outside toward the center of the column of waste. Total flow area of the air inlet damper valves (15) on a system is equal to or slightly greater than that required to maintain an air velocity of 10 feet per second when air requirements are equal to 100 theoretical air for the largest anticipated air requirement (based on the composition of the waste and fuel to be burned). The air inlet damper valve (15) is closed when the damper plate (16) is perpendicular to the direction of air flow, and is open when the damper plate (16) is parallel to the direction of air flow. Positioning of the damper plate (16) is operated by the damper operator (16A) which is controlled by the process control computer. The position of the damper (16) is indicated by the damper plate position indicator (16B). When the process control computer receives a signal indicating that the first combustion chamber temperature is nearing the limits described above, it sends a signal to the operator on the air inlet damper valve (16A) to either open or close the valve as necessary. The operators may be an electric hydraulic cylinder or a DC step motor, the choice being dictated by power requirements.

Often waste has too low a heating value and/or contains insufficient carbon to maintain the 800° F. operating temperature. Under these conditions, energy must be added from an external source to supply the heat not obtainable by controlling the air supply. Propane or natural gas may be used to provide additional energy. A gas jet (17) is provided directly beneath each of the air inlet damper valves (15) previously described (See, FIG. 9). Like the air inlets (14), the gas jets (17) are positioned so that gas enters the first combustion chamber (4) at an angle tangential to the refractory lining. The tangential entry assures that the gas mixes well with the air and burns in a generally clockwise swirl pattern to provide uniform heat throughout the first combustion chamber. Individual pilot lights (not depicted), which may be ignited by continuous firing electrical spark igniters, light each of the gas jets on command from the process control computer. In the center of the first combustion chamber, located beneath the cast iron grate (18), is a high volume burner (19) that assures that waste in the center of the first combustion chamber (4) is ignited and properly heated. The high volume burner is protected from particulate matter by the center burner protector (19A). The high volume burner may also be lit by a pilot light (not depicted) ignited by a continuous firing electrical spark igniter.

Figure 7:
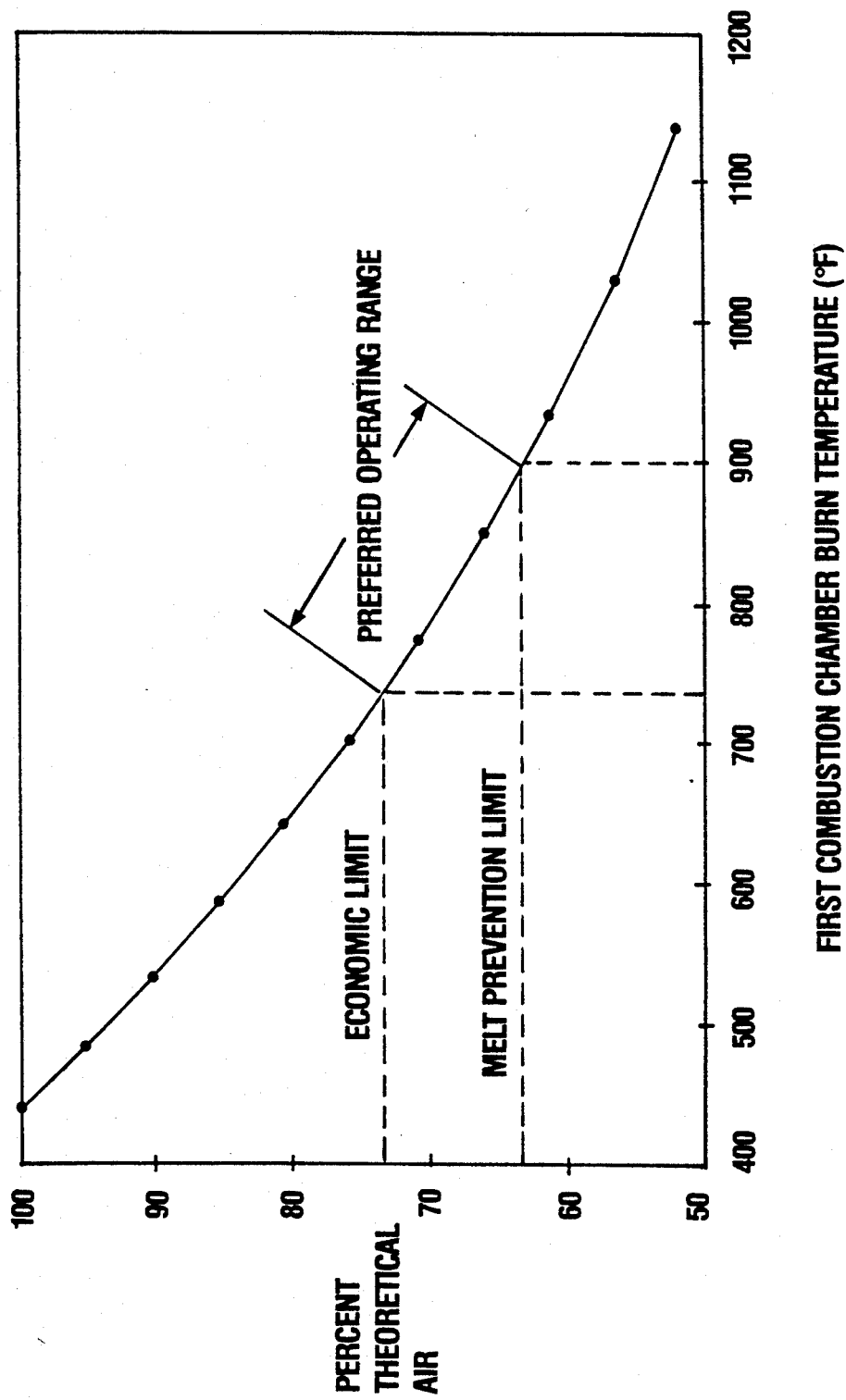
FIG. 7—Graph of percent theoretical air supplied vs. first combustion chamber temperature.

Primary control of the first combustion chamber temperature is accomplished by controlling the air flow within the limits shown in FIG. 7. Secondary control, on the low temperature side, is by intermittently supplying gas or propane to increase the operating temperature. When the first combustion chamber temperature reaches a temperature about 10° F. above the lower temperature limit, the process control computer turns on the igniters, opens the pilot light gas valves and then opens the control valve to the gas jets (17). If the temperature rises to within 10° F. of the upper temperature limit, the process control computer turns off the gas.

Figure 9:
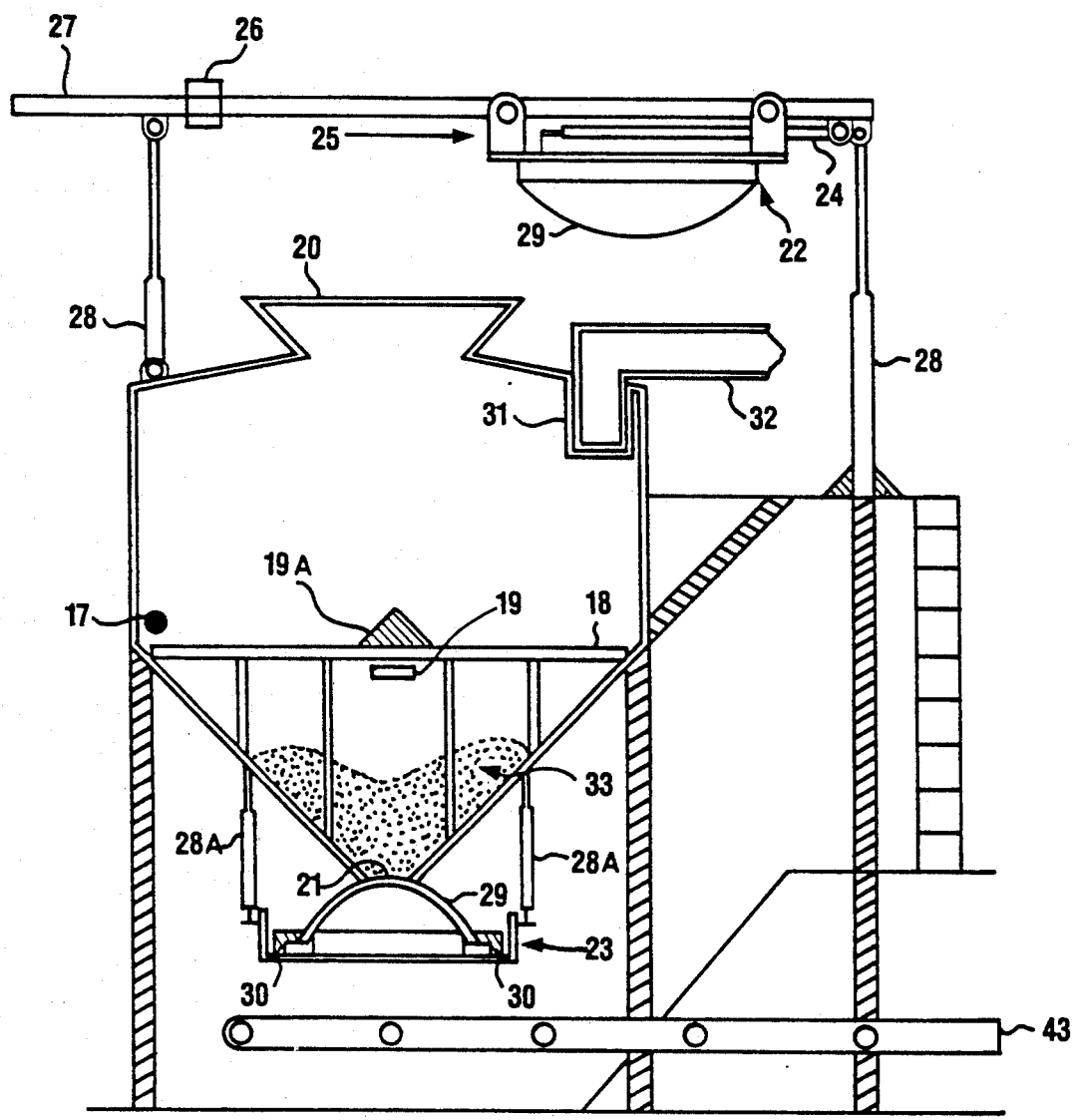

As shown in FIG. 9, openings may be provided at the top (20) and bottom (21) of the first combustion chamber for loading and unloading. Waste enters at the top and residuals exit at the bottom. Hydraulically operated closures (22–23) may be provided on both openings. Operation of both closure systems are the same, except for the direction in which the closure assembly moves to open. The upper closure assembly (22) is lifted upward out of its seat, whereas, the lower closure assembly (23) is lowered down off its seat. Because of this similarity, only the operation of the upper closure assembly (22) will be discussed. In FIG. 9, the upper closure assembly (22) is shown in the open position and the lower closure assembly (23) is shown in the closed position.

To close the upper opening, hydraulic pressure is applied to the piston side of the retracting hydraulic cylinder (24). This moves the upper closure trolley (25) to the left until it is stopped by a stop block (26) on the trolley track (27). Whenever the trolley (25) is not against the stop block (26), the lifting hydraulic cylinders (28) are prevented from operating by a trolley position indicating valve (not depicted, but located on the stop block). When the trolley is against the stop block (26), the trolley position indicating valve allows pressure to be applied to the lifting hydraulic cylinders (28). Conversely, when the trolley (25) is not against the stop block (26), the position indicating valve prevents pressure from being applied to the lifting hydraulic cylinders (28). In a similar fashion, anytime the upper closure assembly (22) is not up against the closure stop (not depicted), the retracting hydraulic cylinder (24) is prevented from operating by a closure position indicating valve, located on the closure stop. When the closure assembly (22) is against the closure stop, the closure position indicating valve allows pressure to be applied to the retracting hydraulic cylinder (24). Conversely, when the closure assembly is not against the closure stop, the closure position indicating valve prevents pressure from being applied to the retracting hydraulic cylinder (24). Design of the seating surfaces are such that the weight of the upper closure assembly is supported by the outer steel shell of the first combustion chamber (4). The load is transferred to the shell via the refractory material. Heat loss at the opening is minimized by ensuring that all metal [except the thin upper closure cover cone (29)] is isolated from the first combustion chamber (4) by refractory material. Opening is accomplished by reversing the procedures described above.

As stated above, the lower closure assembly (23) is opened in a similar fashion to the upper (22) except that it moves downward to open and has an additional hatch latch (30). Since the lowering hydraulic cylinders (28A) must hold up the lower closure assembly (23) against its seat during operation of the first combustion chamber (4), a hatch latch (30) is provided to prevent the lower closure from opening in the event of a hydraulic line or system lose pressure for any reason. When the lower closure assembly (23) is lifted up to the closed position, two hatch latches (30) automatically lock it in place. Before the lower closure assembly (23) can be lowered, the hatch latch (30) must be released by a signal from the process control computer. Once the hatch latch (30) is released, the lower closure assembly (23) can be opened as described above. Ash (9) and recyclable (11) may be removed through the bottom opening (21). For large operations, an ash conveyor (43) may be employed.

As the waste and gas or propane burn in the first combustion chamber (4), flue gas (5) is produced. This gas (5) varies in composition with the waste and gas being burned, the percent theoretical air supplied, and the combustion temperature. Table 4 lists calculated analysis for some of the conditions described above.

TABLE 4

Calculated Gaseous Products Of Combustion From First Combustion Chamber

| % C BURNED AS CO | % $CO_2$ BY VOLUME | % CO BY VOLUME | % $H_2O$ BY VOLUME | % $N_2$ BY VOLUME | % $SO_2$ BY VOLUME |
|---|---|---|---|---|---|
| 0 | 15.59 | 0 | 19.25 | 65.15 | 0.000063 |
| 10 | 14.55 | 1.61 | 19.72 | 64.13 | 0.000055 |
| 20 | 13.42 | 3.35 | 20.22 | 63.02 | 0.000047 |
| 30 | 12.20 | 5.23 | 20.76 | 61.82 | 0.000037 |
| 40 | 10.88 | 7.26 | 21.33 | 60.52 | 0.000027 |
| 50 | 9.46 | 9.47 | 21.96 | 59.12 | 0.000016 |
| 60 | 7.90 | 11.86 | 22.62 | 57.61 | 0.000004 |
| 70 | 6.21 | 14.46 | 23.36 | 55.97 | 0 |
| 80 | 4.34 | 17.30 | 24.16 | 54.20 | 0 |
| 90 | 2.29 | 20.40 | 25.05 | 52.26 | 0 |
| 100 | 0 | 23.82 | 26.03 | 50.15 | 0 |

Figure 10A:
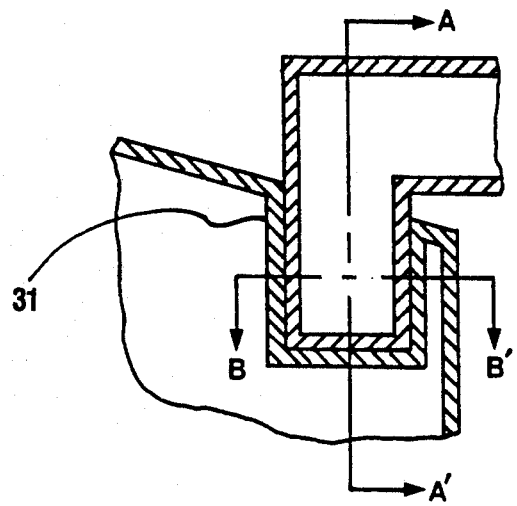
FIG. 10A—Diagram of flue gas deflector.
Figure 10B:
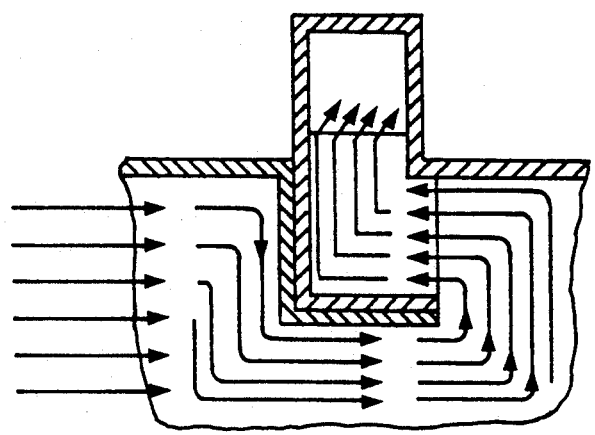
FIG. 10B—Diagram of flow pattern around flue gas deflector as viewed along line A—A of FIG. 10A FIG. 10C—Diagram of flow pattern around flue gas deflector as viewed along line B—B of FIG. 10A FIG. 11—Diagram of cross-sectional view of particulate extraction and containment system.
Figure 10C:
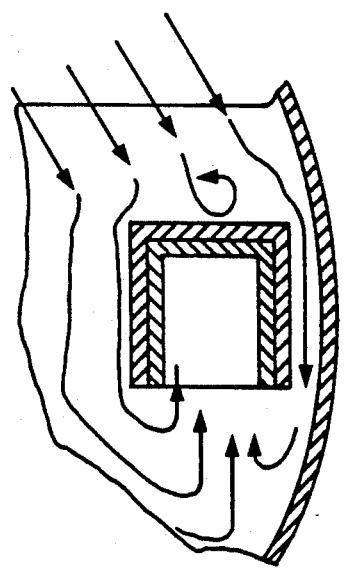

The moving air, gaseous products of Combustion [i.e., flue gas (5)] pick up a certain amount of ash particles (9) and carry them along. To minimize the particulates leaving the first combustion chamber (4) via the exhaust duct (32), a flue gas deflector (31) is built into the first combustion chamber (4). Products of combustion flow upward in a clockwise spiral pattern due to the position of the air inlet damper valves (15). As shown in FIG. 9, the flue gas deflector (31) hangs from the roof of the first combustion chamber (4), directly under the exhaust duct (32). The flue gas deflector (31) is a three sided box with the open side positioned opposite the direction of flow. The bottom of the flue gas deflector (31) is closed, with the top end opening directly into the exhaust duct (32). Flue gas flowing in a clockwise pattern in the lower part of the first combustion chamber hits the solid back wall of the flue gas deflector (31). This disturbance in the flow causes turbulent eddie currents in the flow pattern which causes large quantities of the particulates to fall out of the flow stream into the ash containment portion (33) of the first combustion chamber (4). The flow is forced to turn to the left, right or downward in order to get around the flue gas deflector (31). For example, to enter the exhaust duct (32), part of the flow strikes the back wall of the flue gas deflector (31), slows and turns 90 degrees to the right (toward the center of the first combustion chamber) in the horizontal plane, 90 degrees to the left in the horizontal plane (now flowing parallel to the original direction of flow), 180 degrees in the horizontal plane (in the opposite direction to the original flow), and then 90 degrees upward in the vertical plane. This tortuous path causes a dramatic reduction in the velocity of the flue gas and causes most of the particulate matter to fall into the ash pit (33). Refractory material covers all surfaces of the flue gas deflector to minimize heat losses. FIG. 10A illustrates the flue gas deflector (31) and FIGS. 10B and 10C show the flow patterns.

Figure 11:
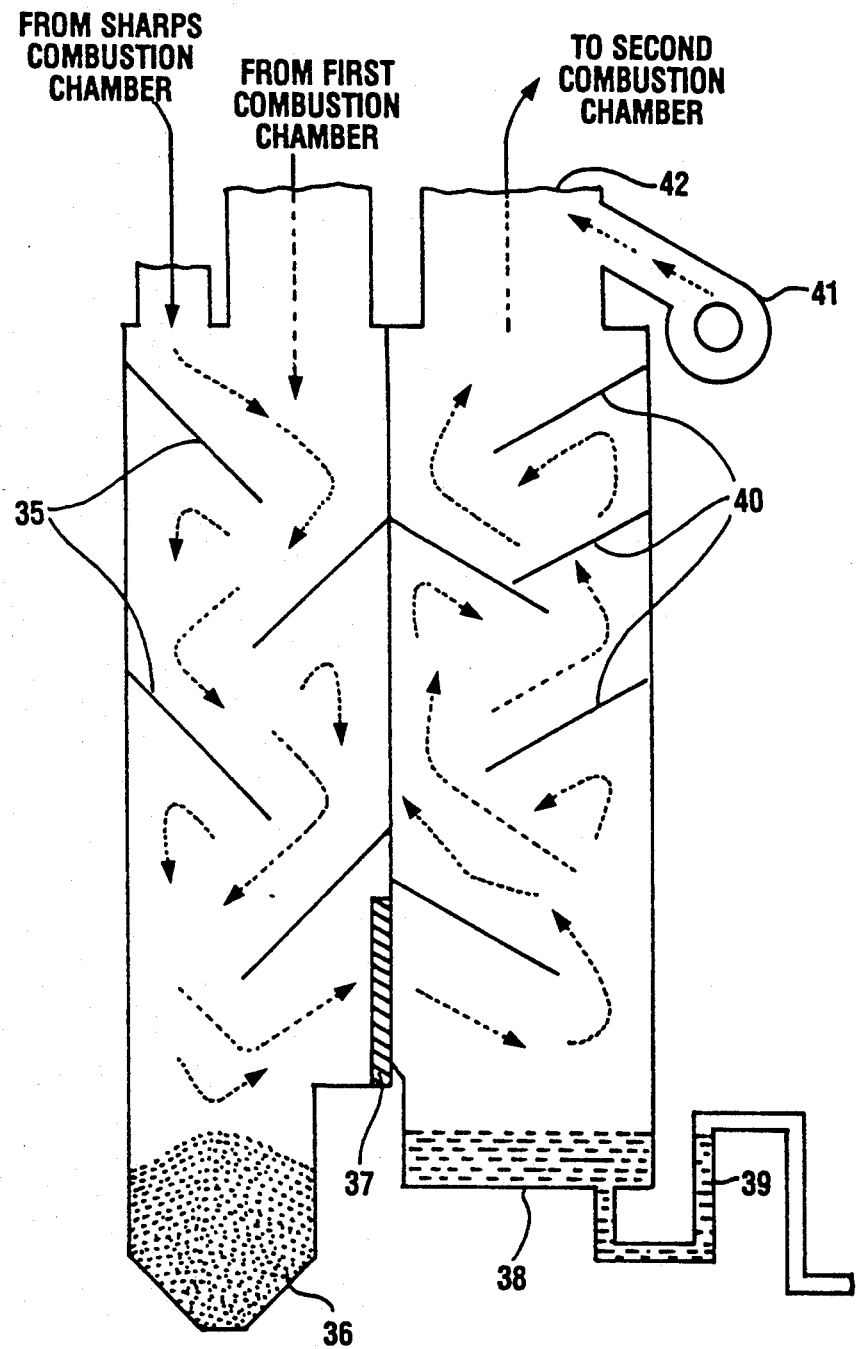

The exhaust duct (32) carries the products of combustion to the particulate extraction and containment system (6). As shown in FIG. 11, the first combustion chamber exhaust duct (32) (and on Medical Waste Systems, the Sharps combustion chamber exhaust duct, see below) brings products of combustion from the first combustion chamber and sharps combustion chamber (34) to the left side of the particulate extraction and containment system (6). Upon entering the system, the combustion products undergo a rapid expansion as the flow area in the particulate extraction and containment system (6) is at least four times larger than the sum of the flow areas of all the exhaust ducts (31) coming into the particulate extraction and containment system. This slows gas velocity by a factor of at least four. Because of the reduction in velocity, the ability of the gas to carry particulate matter is dramatically reduced. Since the density of the particulates are greater than the density of the gas, the particulates are always traveling slower than the less dense gas. The difference in the particulate velocity and the gas velocity is known as slip velocity.

In the particulate extraction and containment system (6), baffle plates (35) extend alternately from each side of the left chamber to further slow the gas flow and aid in particulate fall out. The baffle plates (35) slope downward so that as the particulates fall out of the flow stream, they move by gravity to the collection chamber (36) at the bottom of the left chamber. At the bottom of the left chamber, the gas passes horizontally through a filter (37) that extends the full width of the particulate extraction and containment system (6). Exiting the filter (37), the gases then pass into the right chamber. At the bottom of the right chamber, a fluid trap (38) is connected to a drain line (39) that makes two 'U' turns (similar to 'P' traps used on household drains). The height of the upper 'U' turn is slightly below the top of the fluid trap walls thereby controlling the fluid level in the trap. The drain line (39) terminates in a specially lined tank.

Gases from the left chamber flow upward into the right chamber. The right chamber is not insulated so the gases cool to approximately 150° F., causing water vapor to condense and precipitate into the fluid trap (38). Baffle plates (40) in this chamber slope downward, against the gas flow helping to further slow the flow and give the gases time to cool. In addition to removing condensed water vapor, other vapors occasionally present in the flow (such as sulfuric acid, hydrochloric, mercury, etc.) may also be condensed and removed via the fluid trap. The first combustion chamber exhaust gases (5), less condensed vapors and particulates, exit the particulates extraction and containment system (6) via the second exhaust duct (42) at the top of the right chamber and move to the second combustion chamber (7). Air required for combustion in the second combustion chamber (7) is introduced, typically via a fan or blower (41), into the second exhaust duct (42). Introducing air at this point functions to preheat the air. This warmed air facilitates combustion in the second combustion chamber (7) and increases efficiency.

Figure 12:
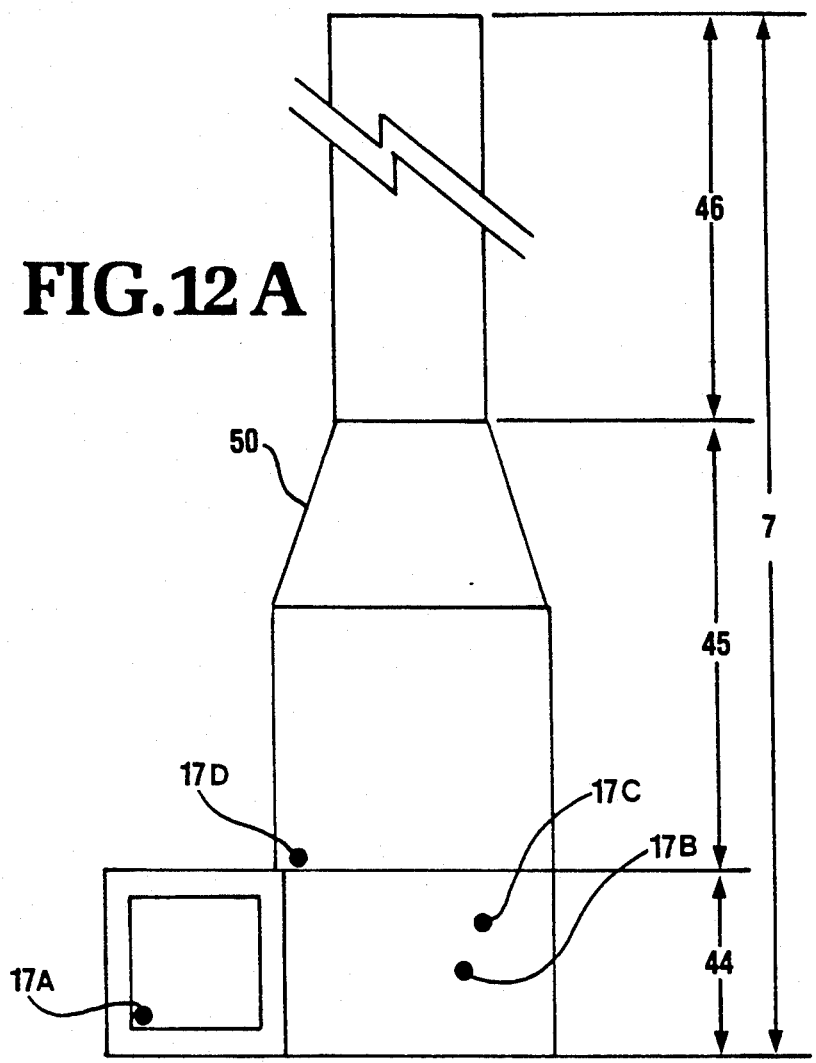
FIG. 12A—Diagram of second combustion chamber.
FIG. 12B—Diagram of convoluted section of the second combustion chamber.
Figure 12:
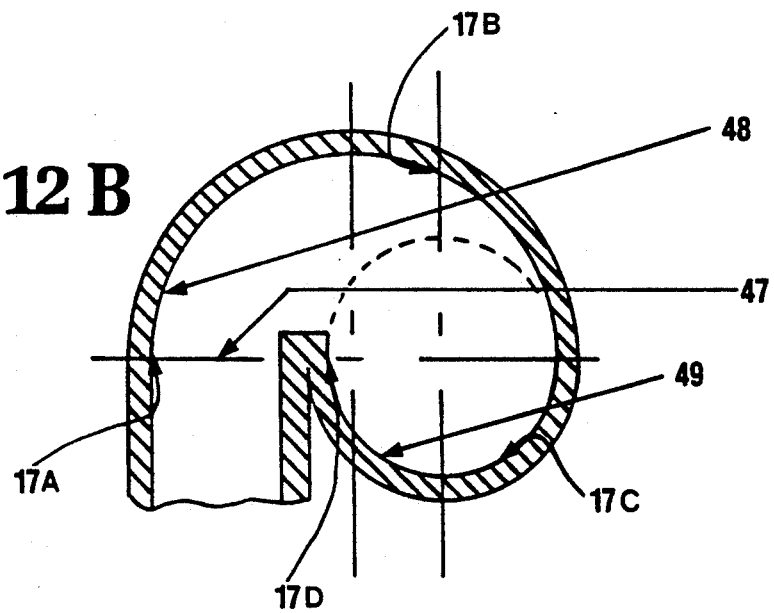

In the preferred embodiment the second combustion chamber (7) comprises three-major parts: a convolute section (44), a swirl chamber (45), and a smokeless stack (46) (See FIG. 12A).

Air and first combustion chamber exhaust gases (5) enter the convolute section (44) via the second exhaust duct (42) from the particulate extraction and containment system (6). As shown in FIG. 12B, the convolute section (44) has a straight entry area opening into a large radius semicircular section (48). Attached to the downstream edge of the large radius semicircular section is a small radius semicircular section (49). The geometric relationship of the two radii are such that the downstream edge of the small radius semicircular section joins the inside wall of straight entry area (47). In other words, the diameter of the small radius semicircular section (49) plus the width of the straight entry area (47) plus one wall thickness of the small radius semicircular section plus one wall thickness of the straight entry area equals the diameter of the large radius semicircular section (48). FIG. 12B depicts a cross-sectional view of the convolute section (44), illustrating these relationships. Natural gas or propane may be introduced at an angle tangential to the curved wall in four places. The first gas inlet jet (17A) is near the bottom outside edge where the large radius semicircular section (48) joins the straight entry area (47); the second gas inlet jet (17B) is located 120 degrees clockwise from the first jet (17A) and one third the height of the convolute section above the base, the third jet (17C) is located 60 degrees clockwise from the joint of the two semicircular sections and two-thirds the height of the convolute section above the base; the fourth jet (17D) is located at the roof line of the convolute section (44), at the tangent point of the downstream edge of the small radius semicircular section (49) and the inside wall of the straight entry area (47). Each of the four gas jets (17A-D) are angled upward five degrees above horizontal to match the air flow. Each gas jet may be ignited by its own pilot light (not depicted) which in turn, is ignited by its own continuous electrical spark igniter. Combustion starts at the entry of the convolute section (44) and continues into the swirl chamber. The delivery of gas or propane is regulated by the process control computer as is the fresh air supplied via the second exhaust (42) in order to maintain the desired fuel/air ratio. The height of the convolute section (44) is such that the exhaust gases from the first (4) and/or sharps combustion chamber (34), fresh air, and fuel gas remain in the convolute section (44) a minimum of two seconds at maximum output (ignoring added time caused by the swirling action). This time plus the additional time provided by the swirl chamber (45) exceed governmental "time at temperature" requirements by at least two-fold.

The swirl chamber (45) is a circular chamber with a diameter equal to the diameter of the small radius semicircular section (49) of the convolute section (44). Its length is calculated to provide a travel time of two seconds for the products of combustion from the convolute section (44) at maximum operating conditions (ignoring added time created by the swirling action of the gases). Like the convolute section (44), the swirl chamber (45) is heavily insulated with refractory material to maintain the desired operating temperature (typically about 2000° F.). The top of the swirl chamber (45) is conically shaped to provide a smooth flow into the smokeless stack (46). The top diameter of the conical section (50) is equal to the diameter of the smokeless stack (46) and the bottom diameter of the conical section (50) is equal to the diameter of the cylindrical portion of the swirl chamber (45).

The smokeless stack (46) has a diameter such that the exhaust gases travel at a velocity of 20 feet per second or less. The actual diameter is selected according to the next larger diameter of readily available pipe. The height of the stack is determined by the following equation:

$$H = (Q^2 / [(88.36)*(A^2)*(t - to)])$$

Where:
H = Height of stack, ft
Q = Exhaust gas flow, ft$^3$/min
2 = Proceeding quantity raised the second power
88.36 = Coefficient for effectiveness of openings
A = Cross-sectional area of stack, ft$^2$
t = Operating temperature of stack, (°F.)
to = Outside temperature, (°F.)

EXAMPLE 2

Figure 13:
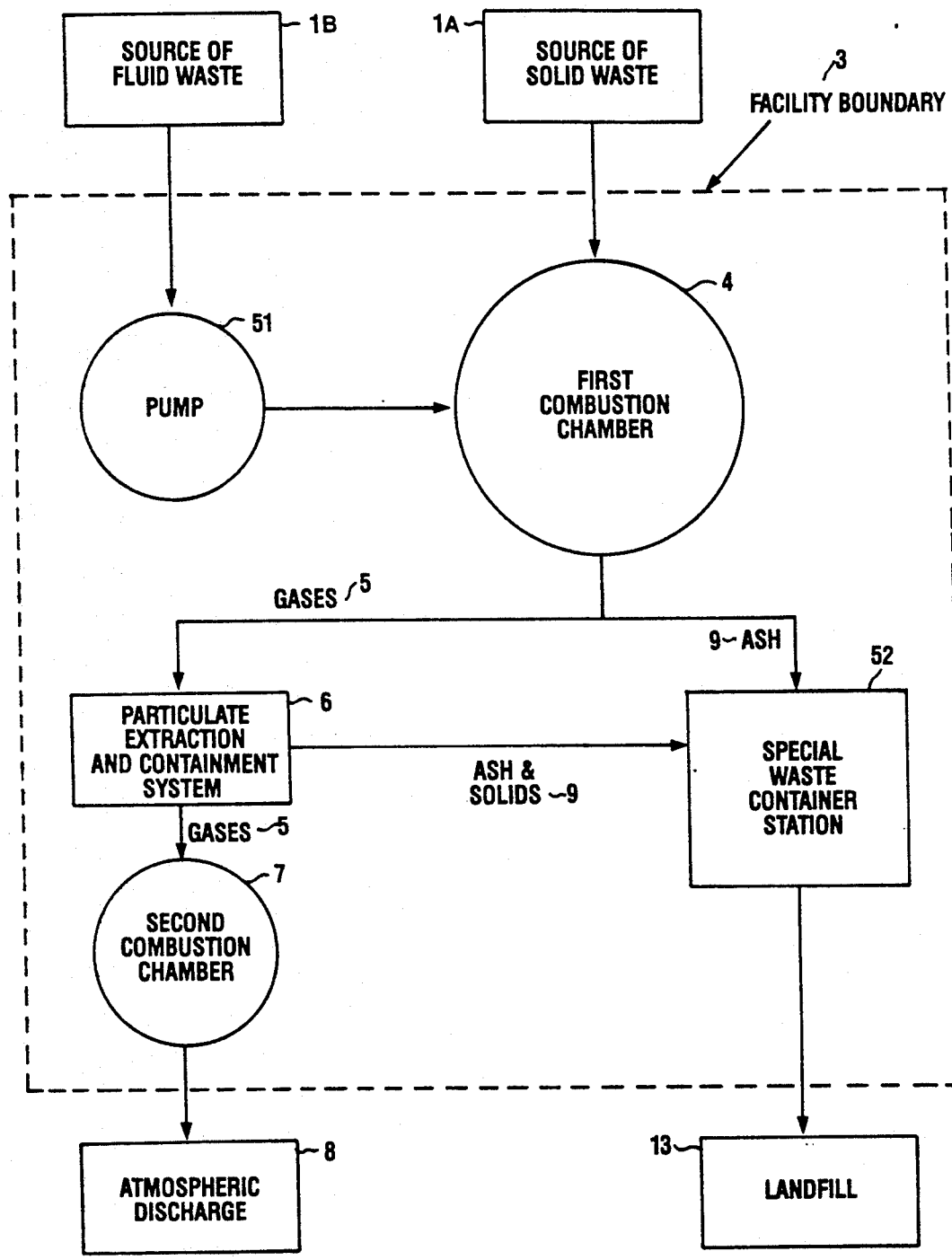
FIG. 13—Diagram of process flow diagram combination solid and fluid waste system.

Combination solid and fluid waste incineration systems are similar in construction and design to the municipal system described above except for the addition of fluid nozzles (not depicted) to spray the fluid into the first combustion chamber during the burn cycle. Many of these systems operate at greater efficiently than municipal incinerators because the fluid to be burned is often combustible. Fluid is typically pumped from a liquid waste storage area (1B) by a pump (51) to the first combustion chamber (4). Fluid nozzles are positioned around the circumference of the first combustion chamber (4), equally spaced between the gas inlet jets (17). Uses of this type system include: disposition of ship waste in ports, oil spills, sewage sludge and clean-up of toxic waste sites. One especially useful application is at oil fields where large volumes of drill waste must be disposed of. Waste fluid is typically taken from the reserve pit and pumped into the first combustion chamber (4) where it is introduced through the fluid nozzles and combusted as described above. FIG. 13 shows a process flow diagram of a typical combination solid and fluid waste incineration system.

EXAMPLE 3

The subject invention also provides a medical incineration system. A medical incineration system is similar to the municipal waste systems described above with the addition of sharps combustion chamber (34) to incinerate sharps (needles and other metallic objects plus broken glass).

Figure 14:
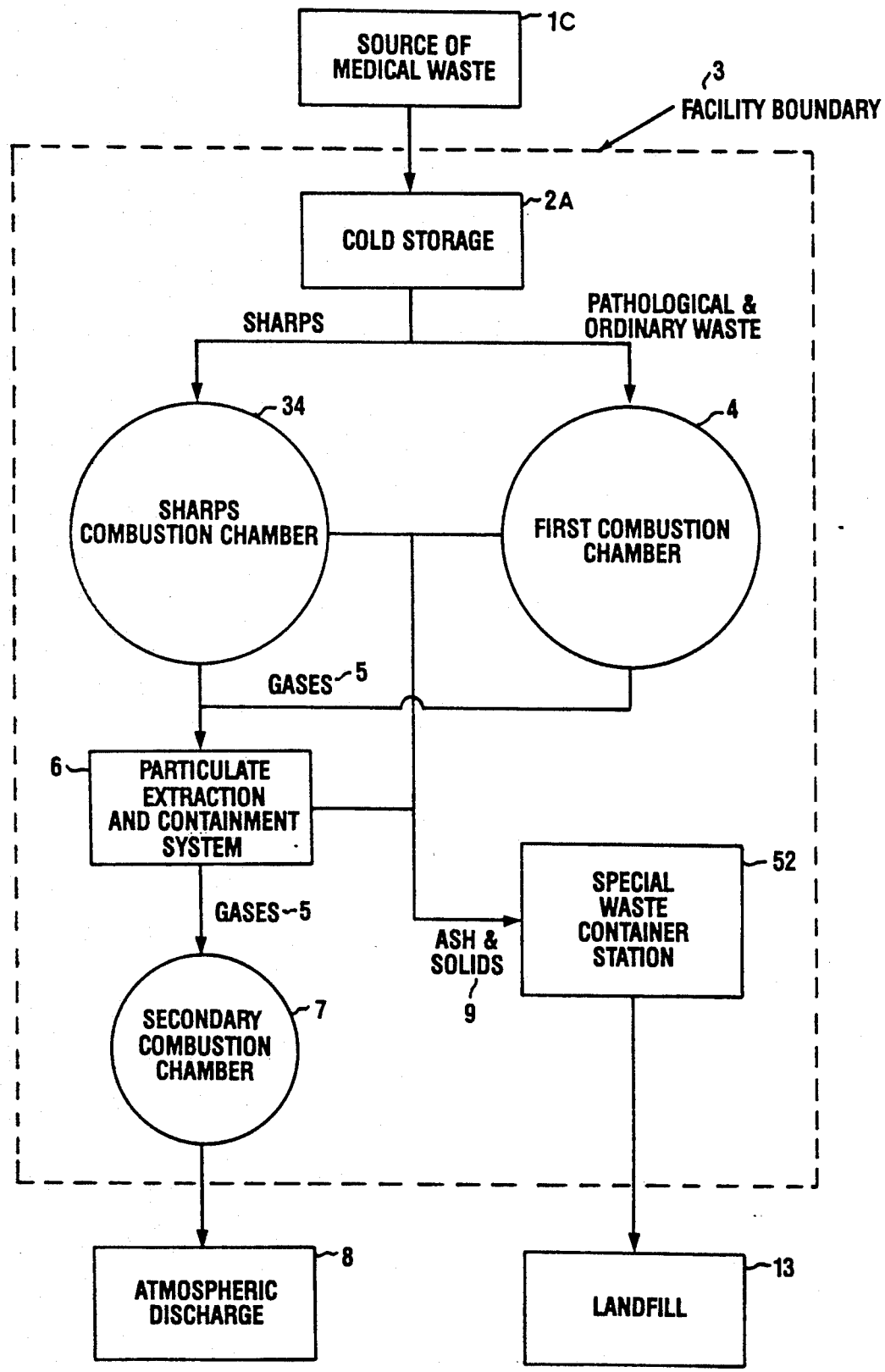
FIG. 14—Diagram of process flow diagram medical (Red Bag) waste system.

To help minimize the risk of disease spreading, a refrigeration unit [cold storage (2A)] may be utilized for storing waste before burning, and a special waste container station (52) may be employed for storing the material remaining after burning. FIG. 14 is a process flow diagram of a typical medical incineration system. So called 'Red Bag' materials including infectious waste, paper, and other materials from hospitals, clinics, or doctors' offices can be burned in the first combustion chamber (4). The sharps combustion chamber (34) in the medical incineration system operates at a temperature high enough to melt the sharps. Typically, this temperature is about 3000° F. utilizing excess air to melt the sharps so they may be safely disposed of together with the ash (9). Exhaust gases (5) from both the first and sharps combustion chambers are discharged into a common particulate extraction and containment system (6). Ash (9) from both the first (4) and sharps combustion chambers (34) may be transported to special waste container station (52) where they are combined and loaded into specially designed bags. These bags are made to specifically made to fit the bed of large trailer normally used for hauling gravel. These bags are similar to those normally used to haul liquids in barges that may not be fluid tight. These special bags have a closure similar to the so called ZIP-LOCK bags, except that once closed, the closure cannot be reopened. Once filled, the bag is hauled to a sanitary landfill or a special waste landfill as required by state and federal law.

Upon reading the subject application, various alternative embodiments may become obvious. These variations are to be considered within the spirit of the subject invention. Accordingly, the scope of the subject invention is only to be limited by the claims and their equivalents.

What is claimed is:

1. An incinerator comprising:
   (a) a first combustion chamber having a wall composed of a refractory material and being capable of receiving material to be incinerated, the first combustion chamber having an air inlet located on the wall, the air inlet being positioned so that air enters the fist combustion chamber at an angle tangential to the wall, the air flow through the air inlet being regulated by an air inlet damper valve to allow combustion of the material and production of a flue gas;
   (b) a second combustion chamber capable of receiving the flue gas, the second combustion chamber being constructed to allow for combustion of the flue gas; and
   (c) means for connecting the first combustion chamber to the second combustion chamber, the means being capable of conducting the flue gas from the first combustion chamber to the second combustion chamber while reducing the temperature of and removing water vapor from the flue gas.

2. An incinerator comprising:
   (a) a first combustion chamber capable of receiving material to be incinerated, the first combustion chamber being constructed in such a manner so as to allow combustion of the material and production of a flue gas;
   (b) a second combustion chamber capable of receiving the flue gas, the second combustion chamber having a convolute section and a swirl section each having a wall made of a refractory material to allow for combustion of the flue gas; and
   (c) means for connecting the first combustion chamber to the second combustion chamber, the means being capable of conducting the flue gas from the first combustion chamber to the second combustion chamber while reducing the temperature of and removing water vapor from the flue gas.

3. An incinerator comprising:
   (a) a first combustion chamber capable of receiving material to be incinerated, the first combustion chamber being constructed in such a manner so as to allow combustion of the material and the production of a flue gas;
   (b) a second combustion chamber capable of receiving the flue gas, the second combustion chamber being constructed to allow for combustion of the flue gas; and
   (c) means for connecting the first combustion chamber to the second combustion chamber, the means being capable of conducting the flue gas from the first combustion chamber to the second combustion chamber while reducing the temperature of and removing water vapor from the flue gas, the second combustion chamber further having a particulate extraction and containment system which includes a plurality of baffle plates.

4. An incinerator of claim 1 further comprising a gas jet.

5. An incinerator of claim 4, wherein the gas jet is positioned so a gas dispersed through the gas jet enters the first combustion chamber at an angle tangential to the wall.

6. An incinerator of claim 5 further comprising means for igniting a gas dispersed through to the gas jet.

7. An incinerator of claim 6, wherein the means for lighting the gas jet comprise a continuous firing electric spark.

8. An incinerator of claim 1 further comprising an external heat supply.

9. An incinerator of claim 8, wherein the external heat supply comprises propane or natural gas.

10. An incinerator of claim 1, wherein the first combustion chamber comprises a flue gas deflector configured in such a manner so as to slow the velocity of flue gas exiting the first combustion chamber.

11. An incinerator of claim 1, further comprising means for introducing material into the first combustion chamber.

12. An incinerator of claim 11, wherein means for introducing material to the first combustion chamber comprise a conveyor.

13. An incinerator of claim 11, wherein means for introducing material to the first combustion chamber comprise a fluid nozzle.

14. An incinerator of claim 2, further comprising a gas jet.

15. An incinerator of claim 2, wherein the gas jet is positioned so that a gas dispersed through the gas jet enters the convolute section at an angle tangential to the wall.

16. An incinerator of claim 15 further comprising means for igniting a gas dispersed through the gas jet.

17. An incinerator of claim 16, wherein means for lighting the gas jet comprise a continuous firing electric spark.

18. An incinerator of claim 2, wherein the convolute section is configured so that the flue gas entering the convolute section is directed in an upwardly spiralling direction.

19. An incinerator of claim 2 further comprising a stack conductively mounted on the swirl section.

20. An incinerator of claim 3, wherein the baffle plates are arranged so as to provide a tortious path for exhaust gases and reduced gas velocity.

21. An incinerator of claim 3, wherein the particulate extraction and containment system comprises a filter.

22. An incinerator of claim 3, wherein the particulate extraction and containment system comprises a fluid trap.

23. An incinerator of claim 3, wherein the particulate extraction and containment system comprises means for removing dioxin, chlorides and fluorides.

24. A method for incineration which comprises:
(a) combusting a material at a temperature of less than about 1,000° F. using a substoichiometric amount of oxygen so as to produce a flue gas;
(b) collecting the flue gas;
(c) cooling the flue gas; and
(d) combusting the flue gas using at least a stoichiometric amount of oxygen.

25. A method of claim 24, wherein the oxygen is present as air.

26. A method of claim 24, wherein the temperature is about 800° F.

27. A method of claim 24, wherein step (c) further comprises removing particulate matter from the flue gas.

28. A method of claim 24, wherein step (c) further comprises removing water from the flue gas.

29. A method of claim 24, wherein step (c) further comprises removing dioxins, and their precursors, mercury, chlorides and fluorides from the flue gas.

30. A method of claim 24, wherein the combusting of step (d) is performed at a temperature of greater than about 1,000° F.

31. A method of claim 30, wherein the temperature is about 2000° F.

32. A method of claim 30, wherein the flue gas is exposed to a temperature greater than about 1000° F. for at least 2 seconds or longer.

* * * * *